United States Patent
Kunjukrishnan

(10) Patent No.: US 12,244,669 B2
(45) Date of Patent: Mar. 4, 2025

(54) IOT DEVICE ONE TAP ACTIVATION

(71) Applicant: T-Mobile Innovations LLC, Overland Park, KS (US)

(72) Inventor: Syam Sarasamma Kunjukrishnan, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/951,550

(22) Filed: Sep. 23, 2022

(65) Prior Publication Data

US 2024/0106896 A1 Mar. 28, 2024

(51) Int. Cl.
| | |
|---|---|
| *H04L 67/12* | (2022.01) |
| *G06Q 20/30* | (2012.01) |
| *G06Q 20/32* | (2012.01) |
| *G06V 40/16* | (2022.01) |
| *H04W 76/10* | (2018.01) |
| *G16Y 40/40* | (2020.01) |

(52) U.S. Cl.
CPC ........... *H04L 67/12* (2013.01); *G06Q 20/308* (2020.05); *G06Q 20/325* (2013.01); *G06V 40/172* (2022.01); *H04W 76/10* (2018.02); *G16Y 40/40* (2020.01)

(58) Field of Classification Search
None
See application file for complete search history.

(56) References Cited

U.S. PATENT DOCUMENTS

| | | | |
|---|---|---|---|
| 10,382,203 B1* | 8/2019 | Loladia ................... H04L 63/06 |
| 2014/0245411 A1* | 8/2014 | Meng ..................... H04L 63/08 726/7 |
| 2015/0130957 A1* | 5/2015 | Berelejis ............. H04L 12/2807 348/211.1 |
| 2016/0080360 A1* | 3/2016 | Child ...................... G06F 21/41 726/6 |
| 2017/0063946 A1* | 3/2017 | Quan ...................... H04L 67/55 |
| 2017/0064550 A1* | 3/2017 | Sundaresan ......... H04W 12/084 |
| 2018/0376277 A1* | 12/2018 | Dudhmahl ............ H04W 12/06 |
| 2019/0124507 A1* | 4/2019 | Dotchkoff ........... H04L 63/0815 |
| 2019/0304264 A1* | 10/2019 | Gauld ....................... G08B 5/36 |
| 2020/0053399 A1* | 2/2020 | Choi ................... H04N 21/4108 |
| 2021/0042730 A1* | 2/2021 | Lee ....................... G06Q 20/308 |
| 2021/0058785 A1* | 2/2021 | Adrangi .................. H04W 4/80 |
| 2021/0127436 A1* | 4/2021 | Smets ................... G06Q 20/325 |
| 2021/0136569 A1* | 5/2021 | Obaidi .................. H04W 12/37 |

(Continued)

FOREIGN PATENT DOCUMENTS

KR 101800737 B1 * 6/2016
WO WO-2017176051 A1 * 10/2017 ............. G06Q 20/06

(Continued)

*Primary Examiner* — Chris Parry
*Assistant Examiner* — Abderrahmen Chouat
(74) *Attorney, Agent, or Firm* — Shook, Hardy & Bacon L.L.P.

(57) ABSTRACT

Systems, methods, and computer-readable media are described for activating an IoT device using a single tap between a user device and the IoT device. Activation of the IoT device proceeds by adding the IoT device onto a wireless service provider account associated with a user and the user device. Billing may also be automatically set-up using this system by adding a billing charge to the wireless provider account.

20 Claims, 6 Drawing Sheets

(56) References Cited

U.S. PATENT DOCUMENTS

| | | | |
|---|---|---|---|
| 2022/0295280 A1* | 9/2022 | Streuter | H04W 76/15 |
| 2022/0309148 A1* | 9/2022 | Streuter | G06F 21/44 |
| 2023/0043318 A1* | 2/2023 | Selman | G06F 21/6209 |
| 2023/0057574 A1* | 2/2023 | Burgess | H04L 63/20 |
| 2023/0058016 A1* | 2/2023 | Wood | H04L 63/08 |
| 2023/0153807 A1* | 5/2023 | Ma | G06Q 20/40145 |
| | | | 705/39 |
| 2023/0199612 A1* | 6/2023 | Butler | H04W 4/029 |
| | | | 455/418 |
| 2023/0214838 A1* | 7/2023 | Ratnakaram | G06Q 20/206 |
| 2024/0080316 A1* | 3/2024 | Wong | H04L 9/0891 |

FOREIGN PATENT DOCUMENTS

| | | | |
|---|---|---|---|
| WO | WO-2019203264 A1 * | 10/2019 | |
| WO | WO-2023077922 A1 * | 5/2023 | |

\* cited by examiner

IOT DEVICE ONE TAP ACTIVATION

SUMMARY

A high-level overview of various aspects of the present disclosure is provided here to introduce a selection of concepts further described below in the detailed description. This summary is neither intended to identify key features or essential features of the claimed subject matter, nor intended to be used as an aid in isolation to determine the scope of the claimed subject matter.

In brief and at a high level, the present disclosure describes, among other things, systems, methods, and computer-readable media that employ a unique method of activating an Internet of Things (IoT) device using a one-tap or single step. When the IoT device is tapped or a communication link is established, the activation process proceeds without requirement of an input from a user. The IoT device is activated in association with a user device service provider account.

BRIEF DESCRIPTION OF THE DRAWINGS

Illustrative embodiments of the present disclosure are described in detail below with reference to the attached drawing, wherein.

DETAILED DESCRIPTION

Figure 1:
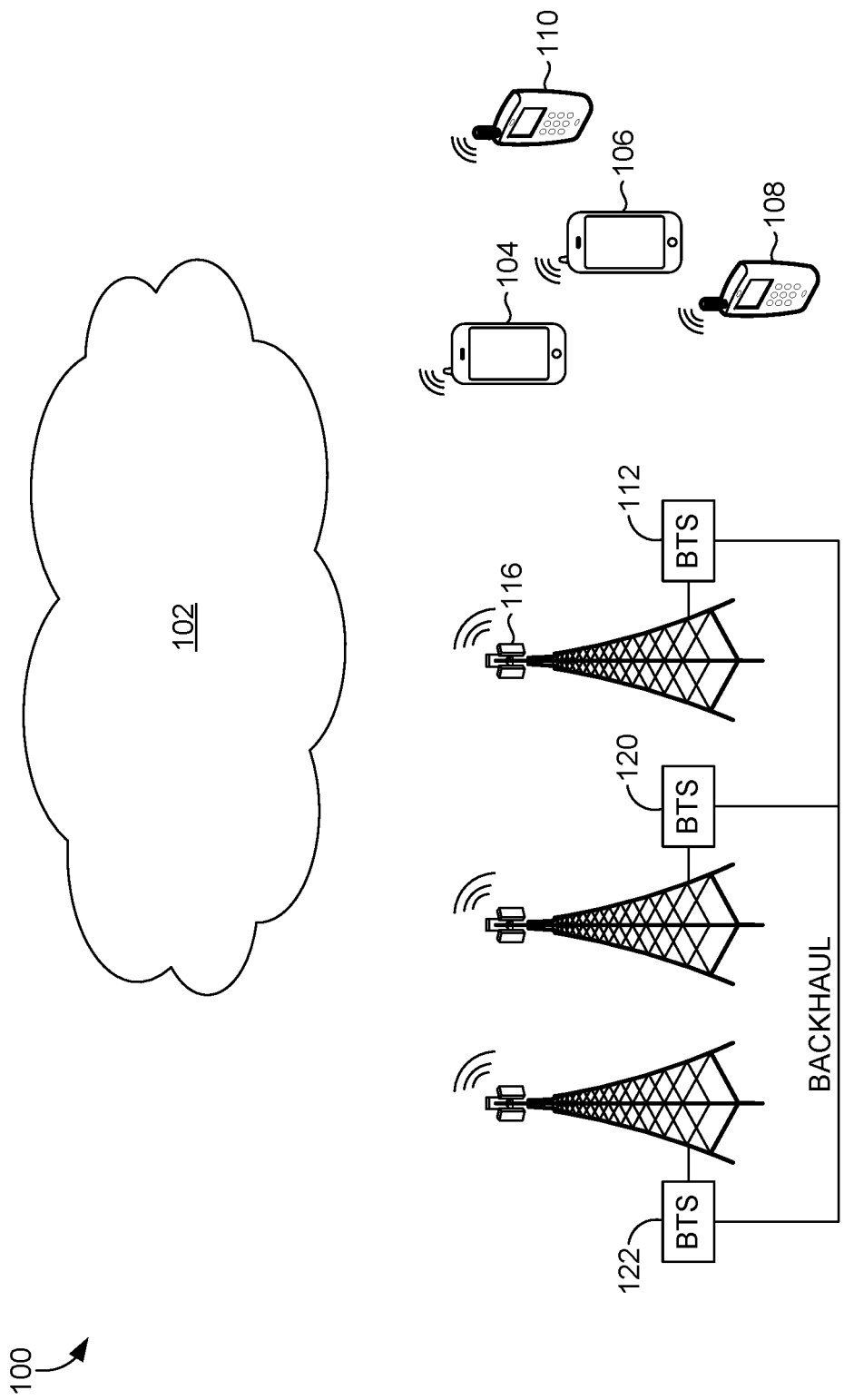
FIG. 1 depicts an exemplary network environment, in accordance with an embodiment of the present disclosure.

The subject matter of selective embodiments of the present disclosure are described with specificity herein to meet statutory requirements. The detailed description is not intended to define what is regarded as the invention nor intended to limit the scope of the claimed subject matter. The claimed subject matter might be embodied in other ways to include different steps or combinations of steps similar to those described herein, in conjunction with other present or future technologies. Terms recited herein should not be interpreted to imply any particular order among or between various steps described herein unless and except when an order of individual steps is explicitly described.

Throughout the detailed description of the present disclosure, several acronyms and shorthand notations are used to aid the understanding of certain concepts pertaining to an associated system and services. These acronyms and shorthand notations are solely intended for the purpose of providing an easy methodology of communicating the ideas expressed herein and are in no way meant to limit the scope of the present disclosure. The following is a list of these acronyms:

AWS Advanced Wireless Services
BRS Broadband Radio Service
BTS Base Transceiver Station
CDMA Code Division Multiple Access
EBS Educational Broadband Services
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
PCS Broadband Personal Communications Service
RNC Radio Network Controller
SyncE Synchronous Ethernet
TDM Time-Division Multiplexing
VOIP Voice Over Internet Protocol
WAN Wide Area Network
WCS Wireless Communications Service
WiMAX Worldwide Interoperability for Microwave Access Further, various technical terms are used throughout the detailed description. Definitions of such terms can be found in, for example, Newton's Telecom Dictionary by H. Newton, 32nd Edition (2022). These definitions are intended to provide a clear understanding of the ideas disclosed herein but are not intended to limit the scope of the present disclosure. The definitions and the terms should be interpreted broadly and liberally to an extent allowed by the meaning of the words offered in the above-cited reference.

Embodiments of the technology described herein may be implemented as, among other things, a method, a system, or a computer-program product. Accordingly, the embodiments may include a hardware embodiment, or an embodiment combining a software and a hardware. In one embodiment, the present disclosure includes the computer-program product that includes computer-useable instructions embodied on one or more computer-readable media.

The computer-readable media includes volatile and/or nonvolatile media, removable and non-removable media, and contemplates media readable by a database, a switch, and various other network devices. Network switches, routers, and related components are conventional in nature, as are the means of communicating with the same. By way of non-limiting example, the computer-readable media includes computer storage media and/or communications media. The computer storage media, or machine-readable media, includes media implemented in any method or technology for storing information. Examples of stored information includes computer-useable instructions, data structures, program modules, and other data representations. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile discs (DVDs), holographic media or other optical disc storage, magnetic cassettes, magnetic tape, magnetic disc storage, and/or other magnetic storage devices. These memory components may store data momentarily, temporarily, or permanently. The computer storage media does not encompass a transitory signal in embodiments of the present disclosure. The computer storage media does not comprise a propagated data signal.

The communications media typically stores computer-useable instructions, including data structures and program modules, in form of a modulated data signal. The term "modulated data signal" refers to a propagated signal that has one or more of its characteristics set or changed to encode information associated therewith. The communications media includes any information delivery media. By way of non-limiting example, the communications media includes wired media, such as a wired network or a direct-wired connection; and wireless media, such as acoustic, infrared, radio, microwave, spread-spectrum, and other wireless media technologies. Combinations of the above are included within the scope of the computer-readable media.

It should be understood that any user equipment (UE) discussed herein is in general form of equipment and machines, such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, or any other smart device that, at least in part, is operated based on micro-service data received via a network. That said, in some embodiments, UE may also include handheld personal computing devices, such as cellular phones, tablets, and similar consumer equipment, or stationary desktop computing devices, workstations, servers and/or network infrastructure equipment. As such, the UE may include both mobile UE and stationary UE configured to request micro-service data from the network.

At a high level, systems, methods, and the computer-readable media described herein provides for the activation of an IoT device with only a single step to be performed by a user of a user device. Currently, the IoT devices require the user to actively participate in the activation of the user device. For example, the user must establish a connection between the user device, participate in providing additional information on the user device (such as preference or device information), and further participate to activate the IoT device. There is no system or method that activates the IoT device on a mobile service provider account using only a single step by the user, where that step is establishing communication between the user device and the IoT device.

According to a first aspect of the present disclosure, a method of activating an IoT device is provided. The method includes receiving an indication from a user device regarding establishment of a wireless communication between the user device and the IoT device, where the IoT device is operating in an activation mode. The method further includes receiving a request from the IoT device to activate the IoT device, based on the wireless communication being established. Based on the received request from the IoT device, the method includes launching a user device service provider application. The service provider application on the user device establishes a connection with a user account associated with the user device, retrieves IoT device information from the IoT device and uses the IoT device information and the user account to activate the IoT device on the user account. Upon activation of the IoT device, the service provider application on the users device then communicates IoT activation information with the IoT device based on the activation of the IoT device.

According to a second aspect of the present disclosure, computer-readable media is provided. The computer-readable media includes computer-executable instructions embodied thereon that, when executed, perform a method. The method includes receiving an indication from a user device regarding establishment of a wireless communication between the user device and an IoT device, where the IoT device is operating in an activation mode. The method further includes receiving a request from the IoT device to activate the IoT device. Based on the received request from the IoT device, the method includes launching a service provider application on the user device. The service provider application on the user device then establishes a connection with a user account associated with the user device, retrieves IoT device information from the IoT device and uses the IoT device information, and the user account to activate the IoT device on the user account. Upon activation of the IoT device, the user device service provider application communicates IoT activation information with the IoT device based on the activation of the IoT device.

According to a third aspect of the present disclosure, a system is provided. The system includes a processor configured to receive an indication from a user device regarding establishment of a wireless communication between the user device and an IoT device, where the IoT device is operating in an activation mode. The processor is further configured to receive a request from the IoT device to activate the IoT device. Based on the received request from the IoT device, the processor is configured to launch a service provider application on the user device. The service provider application on the user device establishes a connection with a user account associated with the user device, retrieves IoT device information from the IoT device and uses the IoT device information and the user account to activate the IoT device on the user account. Upon activation of the IoT device, the service provider application on the user device communicates IoT activation information with the IoT device based on the activation of the IoT device.

According to a fourth aspect of the present disclosure, a system is provided. The system includes a remote server on the network configured to receive an indication from the user device containing the identifier of the IoT device to be activated. The system also includes an IoT device configured to receive an indication from a network regarding establishment of a wireless communication between a remote server and the IoT device, where the IoT device is operating in an activation mode. The IoT device is further configured to receive a request from the remote server to activate the IoT device. Based on the received request from the remote server, the user device is configured to launch a service provider application on the user device and receive information related to the IoT device. The service provider application on the user device establishes a connection with a user account associated with the user device and uses the IoT device information provided by the remote server to activate the IoT device on the user account. Upon activation of the IoT device, the remote server communicates IoT activation information with the IoT device based on the activation of the IoT device.

Referring to FIG. 1, an example of a network environment 100 suitable for use in implementing embodiments of the present disclosure is illustrated. The network environment 100 is illustrated as an example of a suitable network environment and is not intended to suggest any limitation to the scope of use or functionality of the present disclosure. Neither should the network environment 100 be interpreted as having any dependency or requirement relating to any one or combination of components illustrated in FIG. 1.

The network environment 100 includes a network 102 that provides service to current user equipment (UE) 104, Internet of Things (IoT) device 106, and one or more legacy UE 108 and 110. The network 102 may be accessible through a base transceiver station 112 that is connected to a backhaul server (not shown). The base transceiver station 112 and/or a computing device (for example, a local device or a remote device) associated with the base transceiver station 112 may manage or otherwise control operation of components of a cell site, including an antenna array 116. The base transceiver station 112 and/or the computing device associated with the base transceiver station 112 may include one or more processors and computer-readable storage media having computer-executable instructions or computer instruction modules embodied thereon for execution by the one or more processors.

The antenna array 116 may radiate in a particular direction and, thus, may correspond to a particular sector of the cell site. In some embodiments, the antenna array 116 may have a plurality of antenna elements. In one embodiment, the antenna array 116 is configured to have a plurality of elements that in number, arrangement, and/or density, are configured for massive Multiple-in Multiple-out (mMIMO) configuration. In one embodiment, the base transceiver station 112 may include a radio and/or a controller, such as a massive Multiple-Input Multiple-Output (mMIMO) Unit for controlling a mMIMO configured antenna array, such as the antenna array 116 having the plurality of antenna elements. The base transceiver station 112 may use the controller to monitor one or more of throughput, signal quality metrics (for example, signal-to-interference plus-noise ratio (SINR)), number of unique users/subscribers, number of unique UE(s), and/or remote location filings (RLFs) that occur at the base transceiver station 112, all of which may be monitored dynamically and/or stored in a data store. The antenna array 116 may also be configured to operate under a lower order number of antenna elements than an antenna array configured to operate under the mMIMO configuration. Such a lower order configuration may be a legacy system, such as an eight branch transmit and eight branch receive (8T8R) antenna structure.

The base transceiver station 112 may use a radio (such as the radio 624 shown in FIG. 6) that is connected to the antenna array 116 by a physical radio-frequency (RF) path, where the radio is used to cause the antenna array 116 to transmit radio-frequency signals using the plurality of antenna elements. The plurality of antenna elements in the antenna array 116 may include portions of antenna elements (not shown). In some embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or, alternatively, "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. In some embodiments, when the antenna array 116 is operating in the dual technology mode, each portion of the plurality of antenna elements may operate using only one distinct protocol and/or an access technology relative to the other portions in the antenna array 116. In one example, the first portion of antenna elements may operate using 5G wireless access technology and the second portion of antenna elements may operate using 4G wireless access technology. Additionally, it will be understood that the terms "first" and "second" are used herein for the purpose of clarity in distinguishing portions of antenna elements from one another, but the terms are not used herein to limit the sequence, relevance, number of portions, technological functions, and/or operations of each portion unless specifically and explicitly stated.

As such, the base transceiver station 112 may provide the current UE 104, the IoT device 106 and the legacy UE 108 and 110 with access to the network 102. In some embodiments, the first portion of antenna elements may communicate with the current UE 104 and the IoT device 106 using the 5G wireless access technology, and the second portion of the antenna elements may communicate with the legacy UE 108 and 110 using the 4G wireless access technology. When operating in the dual technology mode, the antenna array 116 may concurrently connect to and communicate with the current UE 104, the IoT device 106, and the legacy UE 108 and 110 using, respectively, at least two distinct access technologies. Additionally, the first portion of the antenna elements may communicate with the IoT device 106 using 4G wireless access technology or any other wireless technology.

Accordingly, in one example, when the antenna array 116 is operating in the dual technology mode, the base transceiver station 112 concurrently acts an eNodeB (or "eNB") and gNodeB (or "gNB"). As such, the base transceiver station 112 may provide service to one or more access technologies to both the current UE 104, the IoT device 106 and the legacy UE 108, 110. In addition to communicating with the current UE 104, the IoT device 106, and the legacy UE 108 and 110, the base transceiver station 112 may also communicate with one or more neighboring base transceiver stations. In some embodiments, the base transceiver station 112 may communicate with one neighboring base transceiver station 120 using the first access technology and may communicate with another neighboring base transceiver station 122 using the second access technology. For example, since the base transceiver station 112 may operate concurrently as the eNodeB and the gNodeB using the antenna array 116 that is partitioned and operating in the dual technology mode, the base transceiver station 112 may communicate with other base transceiver stations, such as the neighboring base transceiver stations 120 and 122. For example, the base transceiver station 112 communication may include legacy base transceiver stations that cannot use current access technologies (for example 5G) or current base transceiver stations that lack backward compatibility with prior access technologies (for example 4G). In some embodiments, the base transceiver station 112 may bi-directionally exchange information with the neighboring base transceiver stations 120 and 122 through an X2 interface or X2 link. Information regarding signal quality, RF conditions, one or more RLFs, and SINR levels at each of the neighboring base transceiver stations 120 and 122, and/or as reported from the current UE 104 or legacy UE 108, 110 to the neighboring base transceiver stations 120 and 122, may be communicated to the base transceiver station 112 via the X2 link. Additionally, or alternatively, information regarding the signal quality, the RLFs, and the SINR levels at each of the neighboring base transceiver stations 120 and 122 may be communicated to the base transceiver station 112 over a backhaul.

As mentioned, the base transceiver station 112 may include the radio and/or the controller, such as a memory management unit (MMU) that enables the base transceiver station 112 to adjust or modify the operations and transmissions of the plurality of antenna elements in the antenna array 116. In some embodiments, operations, configurations, and/or settings of each antenna element may be individually controlled and adjusted by the base transceiver station 112 using the controller. In some embodiments, the operations, configurations, and/or settings of the first portion of antenna elements may be controlled and adjusted as a group by the base transceiver station 112 using the controller, such as the MMU, independent of the second portion of antenna elements. In a similar fashion, the operations, the configurations, and/or the settings of the second portion of antenna elements may be controlled and adjusted as a group by the base transceiver station 112 using the controller, independent of the first portion of antenna elements. Accordingly, the base transceiver station 112 may use the controller to independently adjust different groups or portions of the antenna elements within one antenna array, such as the antenna array 116.

In some embodiments, the operations, the configurations, and/or the settings of each individual antenna element may be adjusted and customized. For example, the base transceiver station 112 instructs a portion of the antenna elements to transmit one or more synchronization signals using a periodicity. In another example, the portion of the antenna elements may transmit a plurality of synchronization signals using the periodicity, as instructed by the base transceiver station 112. In some embodiments, the synchronization signals may be specific to and/or configured for the first access technology.

Accordingly, the base transceiver station 112 may use the controller to independently adjust different individual antenna elements, any number of groupings and/or subset(s) of each portion of the antenna elements, and/or portions of the antenna elements within one antenna array, such as the antenna array 116. In some embodiments, the base transceiver station 112 may use the controller to measure and monitor one or more of throughput, signal quality metrics (for example, SINR), number of unique users/subscribers, number of unique UE, and/or RLFs.

Figure 2:
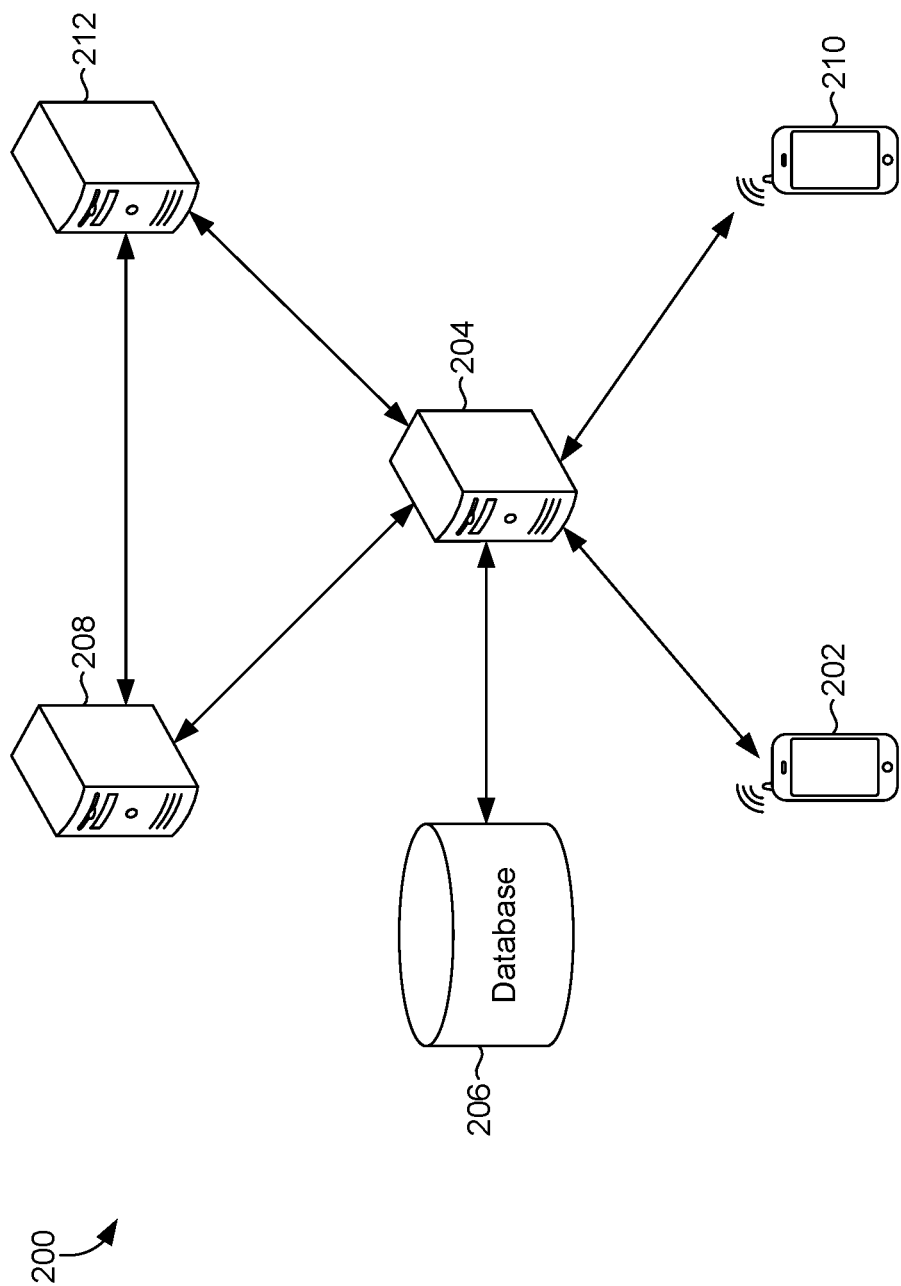
FIG. 2 depicts an exemplary telecommunications environment, in accordance with an aspect of the present disclosure.

Referring to FIG. 2, an exemplary network environment 200 is illustrated in which implementations of the present disclosure may be employed. The network environment 200 is one example of a suitable network environment and is not intended to suggest any limitation as to the scope of use or functionality of the present disclosure. Neither should the network environment 200 be interpreted as having any dependency or requirement relating to any one or combination of components illustrated.

The network environment 200 represents a high level and simplified view of relevant portions of a modern wireless telecommunication network. At a high level, the network environment 200 may generally include one or more UEs, such as a first UE 202 and a second UE 210, a network 204, a database 206, one or more user device accounts, such as a first user device account 208 and a third party account 212, though in some implementations it may not be necessary for certain features to be present. The network environment 200 is generally configured for wirelessly connecting the first UE 202 with other UEs and with other telecommunication networks, such as a publicly-switched telecommunication network (PSTN), or data or services that may be accessible on one or more application servers or other functions, nodes, or servers not illustrated in FIG. 2, so as to not obscure the focus of the present disclosure. As illustrated generally, the first UE 202 may be implemented as, for example, a tablet, a phone, or a wearable device, or any other device discussed with respect to FIG. 1.

The first UE 202 is generally configured to transmit and receive one or more signals to and from a base transceiver station (such as the base transceiver station 112 in FIG. 1) associated with the network 204. Communication protocols associated with the network 204 are configured to receive one or more signals from the first UE 202, and the one or more signals may be implemented as uplink signals. In response to receiving certain requests from the first UE 202, the communication protocol may communicate with the network 204. For example, in order for the first UE 202 to connect to a desired network service (for example, PSTN call, voice over LTE (VOLTE) call, voice over new radio (VoNR), data, or the like), the first UE 202 may communicate an attach request to the communication protocol, which, in response, may communicate a registration request to the network 204. The communication protocol may take the form of a home network (for example, a protocol belonging to or affiliated with a carrier associated with the first UE 202) or a visiting/roaming network (for example, a protocol belonging to or operated by an entity other than the carrier associated with the first UE 202, but which, in certain conditions, may provide extended wireless access to the first UE 202 beyond a reach of the home network).

The network 204 may be a part of a telecommunication network that connects subscribers to their service provider. In some aspects, the service provider may be a telecommunications service provider, an internet service provider, or any other similar service provider that provides at least one of voice telecommunications and/or data services to the first UE 202 and any other UEs. For example, the network 204 may be associated with a telecommunications provider that provides services (for example, LTE) to the first UE 202. Additionally, or alternatively, the network 204 may provide voice, SMS, and/or data services to user devices or corresponding users that are registered or subscribed to utilize the services provided by the telecommunications provider. The network 204 may include any communication network providing voice, SMS, and/or data service(s), using any one or more communication protocols, such as a 1×circuit voice, a 3G network (for example, CDMA, CDMA2000, WCDMA, GSM, UMTS), a 4G network (WiMAX, LTE, HSDPA), or a 5G network. The network 204 may also be, in whole or in part, or have characteristics of, a self-optimizing network.

The network 204 includes one or more systems that are enabled for routing information and/or enabling communication between the first UE 202 and the second UE 210. Additionally, the network 204 includes one or more systems that are enabled for communication between the network 204, the first UE 202 and the first user device account 208. In one example, the first user device account 208 is directly associated with the network 204. For example, the network 204 enables the first UE 202 to communicate by way of the network 204 because the first UE 202 is subscribed to the network 204 through the first user device account 208. The network 204 is enabled to communicate with the first user device account 208 through one or more systems and/or the database 206. The first user device account 208 enables the first UE 202 to communicate through the network 204. In other words, the first user device account 208 identifies the first UE 202 as a subscriber to the network 204. For example, first user device account 208 may be a subscriber account with a particular telecommunications company. The network 204 may be operated as a part of that telecommunications network or may be operated by another telecommunications network as described above.

The first user device account 208 enables the first UE 202 to communicate by way of the network 204. The first user device account 208 enables the network 204 to authenticate the first UE 202 through a variety of means and authorizes the first UE 202 to use the network 204. The first user device account 208 stores, in the database 206, identifying information, such as username, user ID, account number, the first UE 202 identifiers, the first UE 202 make and model, and other personal information, such as device preferences or authorization to initialize or activate IoT devices (such as the IoT device 106).

In one aspect, the first user device account 208 acts as an account management system for the first UE 202. For example, the first user device account 208 may authorize the first UE 202 to communicate by way of the network 204. The first user device account 208 may also maintain a record of preferences for a user of the first UE 202 and maintain an ability to authenticate the user of the first UE 202. For instance, the first UE 202 may have several users, where each user has a variety of ability to authorize actions taken on the first UE 202, or each individual user has their own authentication information stored on the first user device account 208. Additionally, the first user device account 208 may maintain an ability to authorize the activation of the second UE 210 using device information obtained from the IoT device 106 or the second UE 210. The device information needed may vary depending on what device the second UE 210 may be. For instance, a relevant device may require a specific identification of the particular device.

Relevant to this disclosure, the first UE 202 may first initiate a request to activate the second UE 210. This may be done by way of a one-tap or one-touch activation. For example, the user may initiate the activation of the second UE 210 by tapping the second UE 210 on the first UE 202. This may be done using a configured tap interface and zone on the first UE 202 to initiate a near field communication (NFC) between the first UE 202 and the second UE 210. The NFC is a set of communication protocols that enable communication between two electronic devices over a distance of 4 cm (1½ in) or less. The NFC offers a low-speed connection through a simple setup that can be used to bootstrap more-capable wireless connections. NFC devices can act as electronic identity documents and keycards, such as an electronic keycard or IoT identity document, for the second UE 210. This NFC system may be used in contactless activation system and may allow the first UE 202 to obtain activation document and information from the second UE 210. The NFC can be used to share small files, such as IoT identifiers, required for IoT activation. Additionally, the NFC can be used to communicate contacts or IoT activation documents and for bootstrapping fast connections to share larger media, such as photos, videos, and other files, between the first UE 202 and the second UE 210.

Additionally, in an alternative embodiment, the IoT activation information may be communicated through a communication link between the first UE 202 and the second UE 210. The communication link may be initiated by use of an optical code input or a QR code reader. In other embodiments, the communication link or information from the second UE 210 may be communicated by way of other means not disclosed herein. The user may take a picture of a QR code located or positioned on or near the second UE 210 or a QR code located within instructions associated with activating the second UE 210. Upon taking an image or selecting the QR code associated with the second UE 210, the first UE 202 may then be able to retrieve required documents and identification associated with the activation of the second UE 210. The QR code may have a link to a website associated with the manufacturer or seller of the second UE 210, which may then in turn have the required information to activate the second UE 210.

Once authorized to activate the second UE 210, the first UE 202 may initiate or open an application which may communicate, by way of the network 204, with the first user device account 208. Upon receiving a request to activate the second UE 210 by way of the first UE 202 and the application, the first user device account 208 may authorize the user of the first UE 202 as one authorized to activate the second UE 210. Upon authorizing the user, the first user device account 208 may then initiate activation of the second UE 210 using device information obtained from the second UE 210. The activation process may include authentication of the second UE 210, management of the first user device account 208, adding lines to the first user device account 208, adding a billing code, adding notifications to the first UE 202, or automatically installing an application associated with the second UE 210 on the first UE 202.

In an additional embodiment, the first user device account 208 may communicate with a third party account 212 when activating the second UE 210. For example, when the first user device account 208 activates the second UE 210, such activation may require additional set-up with the third party account 212. By registering or setting-up the second UE 210 with the third party account 212, the third party account 212 may then be authorized to monitor the second UE 210. As an example, the second UE 210 may contain a monitoring system, such as a camera system, that may be monitored by a third party. Activating or setting the second UE 210 with the third party account 212 allows the third party to monitor the second UE 210. Registering the second UE 210 with the third party account 212 may have other implications, such as billing a third party account 212, and activating the second UE 210 with the third party account 212.

Figure 3:
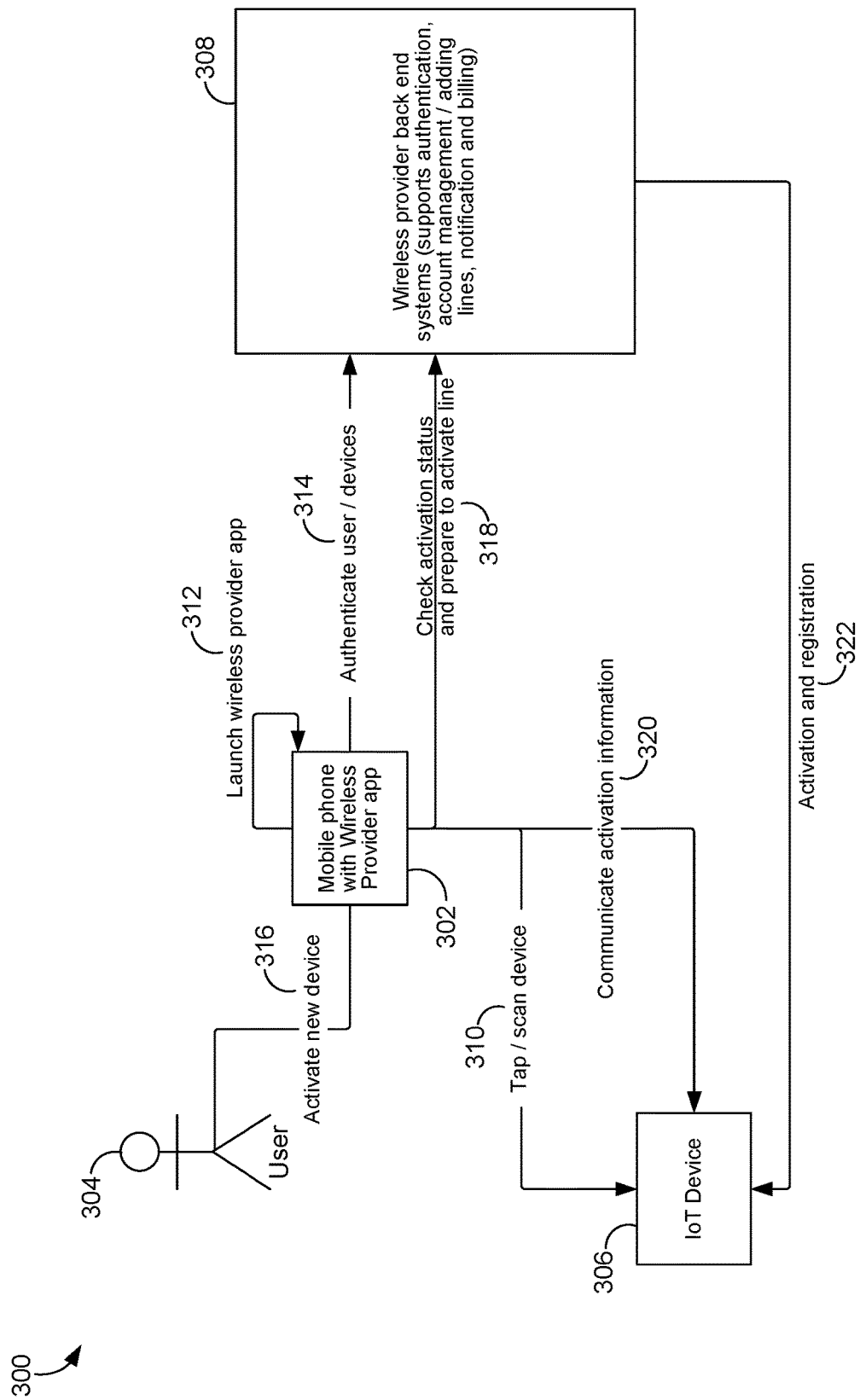
FIG. 3 depicts an exemplary wireless communications environment, in accordance with an aspect of the disclosure.

Turning now to FIG. 3, an exemplary wireless communications environment 300 is shown according to one aspect of the present disclosure. The wireless communications environment 300 may include one or more user devices, such as a first UE 302 or an IoT device 306, which may correspond to the first UE 202 and the second UE 210 respectively as described with respect to FIG. 2 and may exist with one or more components discussed in greater detail herein and is not meant to exhaustively show every interaction that would be necessary to practice the present disclosure, so as to not obscure the inventive concept but is instead meant to illustrate one or more potential interactions between components. The wireless communications environment 300 may include a first user authorized to activate the IoT device 306 using the first UE 302. Additionally, the wireless communications environment 300 may include a wireless provider backend system 308 which may correspond to the first user device account 208 as described with respect to FIG. 2.

In some embodiments, the first UE 302 may initiate activation of the IoT device 306, at step 310, by tapping (as described above) or any other method of initiating the NFC, Bluetooth, wired, or any other wireless communication with the IoT device 306. Additionally, the method of initiating may include any form of attaching, either physically or wirelessly, the first UE 302 with the IoT device 306. For example, an authorized first user 304 of the first UE 302 may tap the IoT device 306 in the first UE 302 which initiates the NFC between the first UE 302 and the IoT device 306. For the IoT device 306 to request activation from the first UE 302, the IoT device 306 must be in an activation mode. The IoT device 306 may be initially in the activation mode, or it may be required to manually change settings or reset the IoT device 306 such that it is in the activation mode. The IoT device 306 may be initially in the activation mode when the IoT device 306 is reset or set to the initial factory settings. Once communication is established between the first UE 302 and the IoT device 306, information of the IoT device 306 is communicated from the IoT device 306 to the first UE 302. Such device information may be, but is not limited to, device identifier, IoT device SIM information, device requirements, make, manufacture, model, version, or any other information that may be necessary or helpful when activating the IoT device 306. In some embodiments, the first UE 302 may obtain at least some of the information from a database, such as the database 206, which may contain information associated with the IoT device 306. Once communication is established between the first UE 302 and the IoT device 306, a request to activate the IoT device 306 may be sent from the IoT device 306 to the first UE 302.

The first UE 302, upon receiving a request to activate the IoT device 306, may launch a wireless provider application on the first UE 302 at step 312. The wireless provider application may authenticate the user 304 of the first UE 302 as an authorized user of the first UE 302. At step 314, the wireless provider application may further authenticate the user 304 of the first UE 302 as authorized to activate the IoT device 306 using the first UE 302. For example, the first UE 302 may have several users which are authorized to use the first UE 302. However, only some of the users may be authorized to activate the IoT device 306 which may require adding a line to a wireless provider account of the first UE 302. The authentication of the user 304 may be done using at least one of a facial identification, saved passwords, an authentication code, a verbal identification, a fingerprint identification, device recognition, or any other mode of authentication. The wireless provider application may utilize information stored in the wireless provider backend system 308 to authenticate the user 304.

The wireless provider application may also request that the IoT device 306 be authenticated. For example, the wireless provider application may send the IoT device 306 identifier received to the wireless provider backend system 308 to be authenticated. The wireless provider backend system 308 may compare an identifier of the IoT device 306 with a database of IoT device identifiers. A match of the identifier of the IoT device 306 and the corresponding database information may then provide authentication of the IoT device 306. Additionally, the wireless provider application may then access other information associated with the IoT device 306 from a database in the wireless provider backend system 308.

Further, the wireless provider application may present an option at step 316 for the user to initiate the activation process. For example, the wireless provider application may present, on a graphical user interface, an option to the user to select or request that the wireless provider backend system 308 activate the IoT device 306. In other embodiments, the wireless provider application may automatically initiate the activation process without requiring the user 304 to request activation of the IoT device 306.

At step 318, the wireless provider application may request an activation status of the IoT device 306. The IoT device 306 may be new and in an inactivated status. The IoT device 306 may also be a used or activated under a different user device account. For example, the IoT device 306 may be previously activated using a different user other than the user 304. By requesting the activation status of the IoT device 306, the wireless provider application may determine if the IoT device 306 may need to be removed from a previous user device account or may be activated without such removal.

Further at step 318, the wireless provider backend system 308 may then activate the IoT device 306 in association with a wireless service provider account associated with the user 304 and the first UE 302. Activation of the IoT device 306 may include adding the IoT device 306 as a line or a device in the wireless service provider account associated with the first UE 302. The activation may also include adding notifications on the first UE 302 in association with the IoT device 306. Additionally, the IoT device 306 may require a one-time charge or a recurring charge to activate. As such, by requesting to activate the IoT device 306, necessary charges may be added to the wireless service provider account associated with the first UE 302. For example, if the IoT device 306 has a one-time activation charge, the charge will be billed under a normal billing method for the wireless service provider account associated with the first UE 302. Additionally, the IoT device 306 may require activation with a third-party account, such as third party account 212. The wireless provider application may automatically activate the IoT device 306 with the third-party account or it may prompt the user 304 to manually activate the IoT device 306 with the third-party account. An additional third-party application may also be installed, either automatically or manually, and launched on the first UE 302 if required for the activation of the IoT device 306.

When the activation is complete, a central system or the wireless provider backend system 308 may communicate with the first UE 302 that the activation is complete and may provide activation information. At step 318, the activation information is communicated from the first UE 302 to the IoT device 306. Additionally, at step 320, the wireless provider backend system 308 may communicate to the IoT device 306, by way of a wireless signal, the activation and registration information contained therein.

An alternate implementation could communicate activation information to the IoT device 306 in step 322, instead of through step 318.

Figure 4:
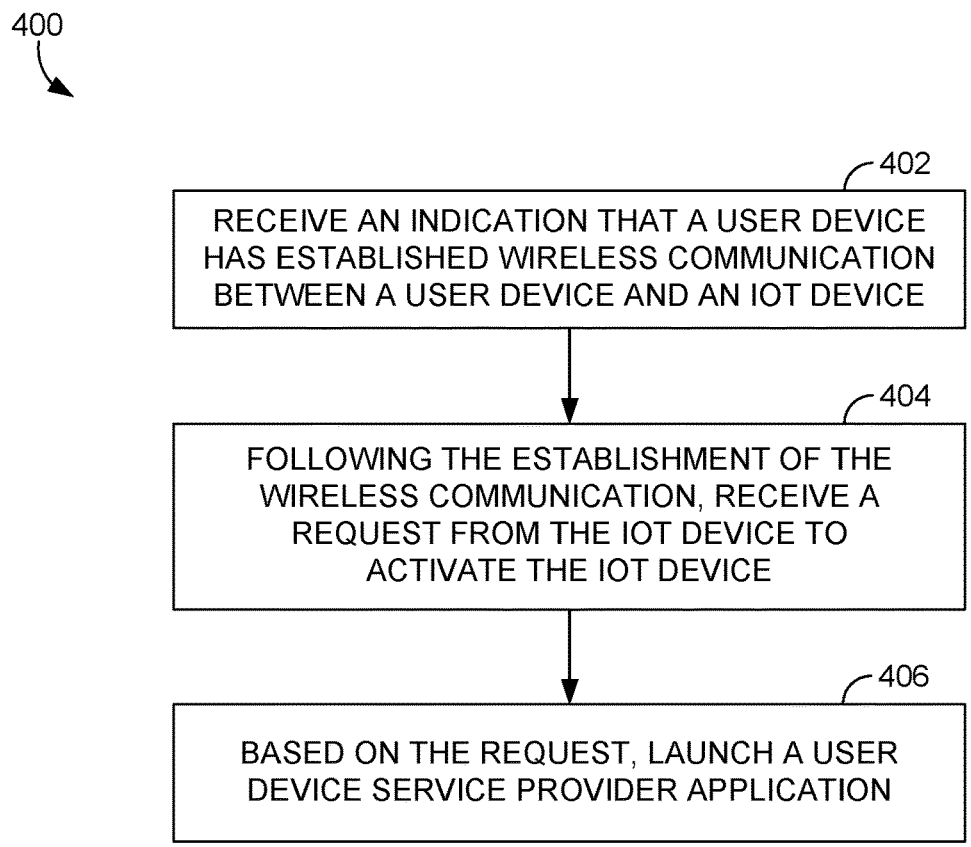
FIG. 4 depicts a flowchart of an exemplary method, in accordance with an aspect of the present disclosure.

Referring now to FIG. 4, a flowchart of an exemplary method 400 is illustrated for providing a one-step activation of an IoT device (such as the second user device 210 and the IoT device 306), according to one aspect of the present disclosure. The method 400 is described in conjunction with FIG. 1 to FIG. 3. Initially, at block 402, the method 400 includes receiving an indication that a user device (such as the first UE 302) has established communication between the user device and an IoT device (such as the IoT device 306). When the communication is established between the two devices, information about the IoT device is communicated from the IoT device to the user device. A variety of means may be employed to establish this communication and is described above. At block 404, the method 400 includes receiving a request from the IoT device to activate the IoT device. The request to activate the IoT device may cause, at block 406, the user device to launch a user device service provider application on the user device.

Figure 5:
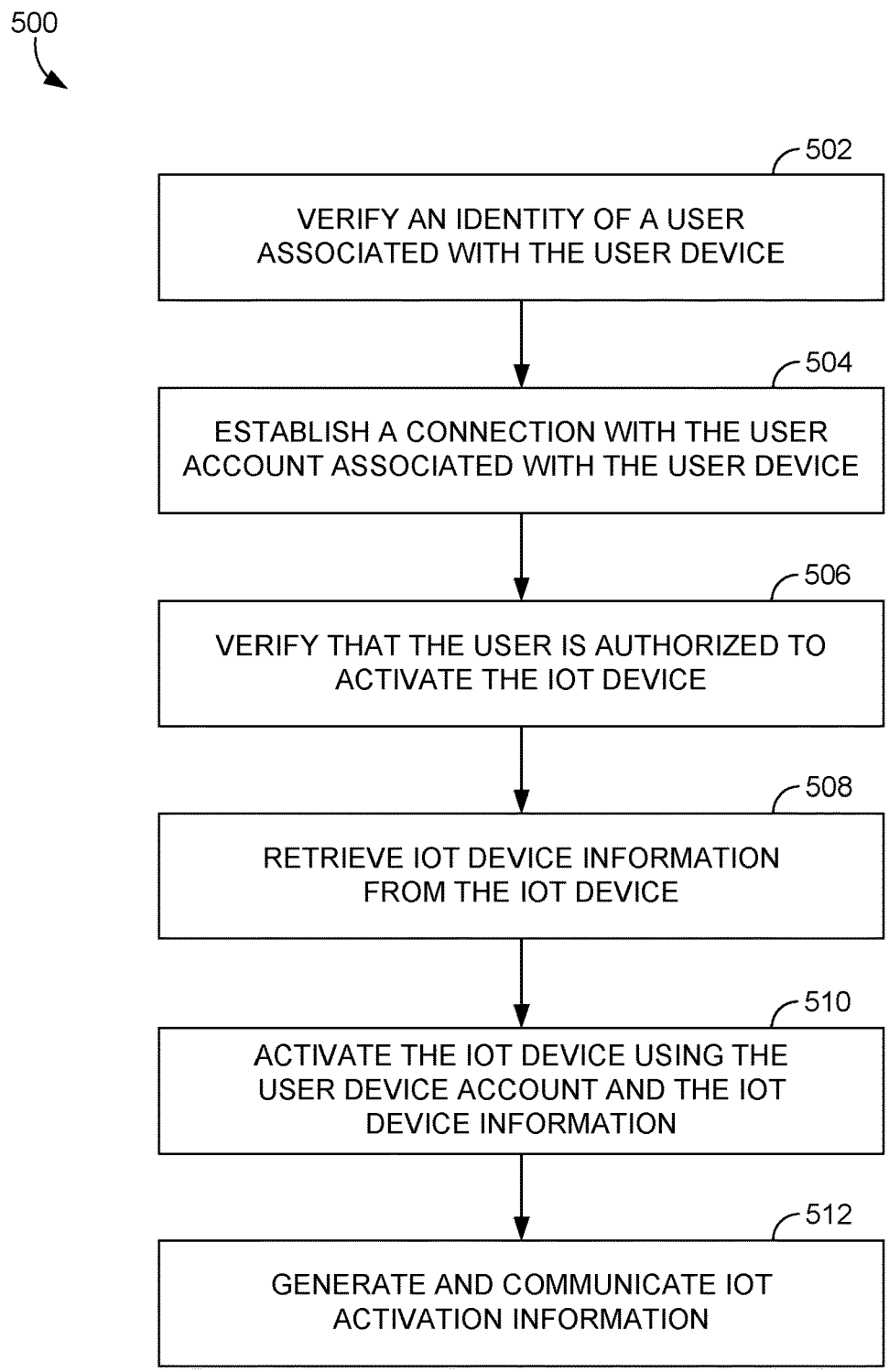
FIG. 5 depicts a flowchart of an exemplary method, in accordance with another aspect of the present disclosure.

Referring to FIG. 5, a flowchart of an exemplary method 500 is illustrated for providing a one-step activation of an IoT device (such as the second user device 210 and the IoT device 306), according to another aspect of the present disclosure. The method 500 is described in conjunction with FIG. 1 to FIG. 4. Initially, at block 502, the method 500 includes verifying the user associated with the user device (such as the first UE 302). At block 504, the method 500 includes establishing a connection with the user account (such as the first user device account 208) associated with the user device. This may be done by connecting with the wireless provider backend system 308 and accessing the user account associated with the user device. At block 506, the method 500 includes verifying that the user or the user device is authorized to activate the IoT device. At block 508, the method 500 includes retrieving IoT device information from the IoT device. At block 510, the method 500 includes activating the IoT device using the user account and the IoT device information. The activation may include adding the IoT device as a line on the wireless service provider account associated with the first UE 302. At block 512, the method 500 includes generating and communicating IoT activation information to the IoT device.

Figure 6:
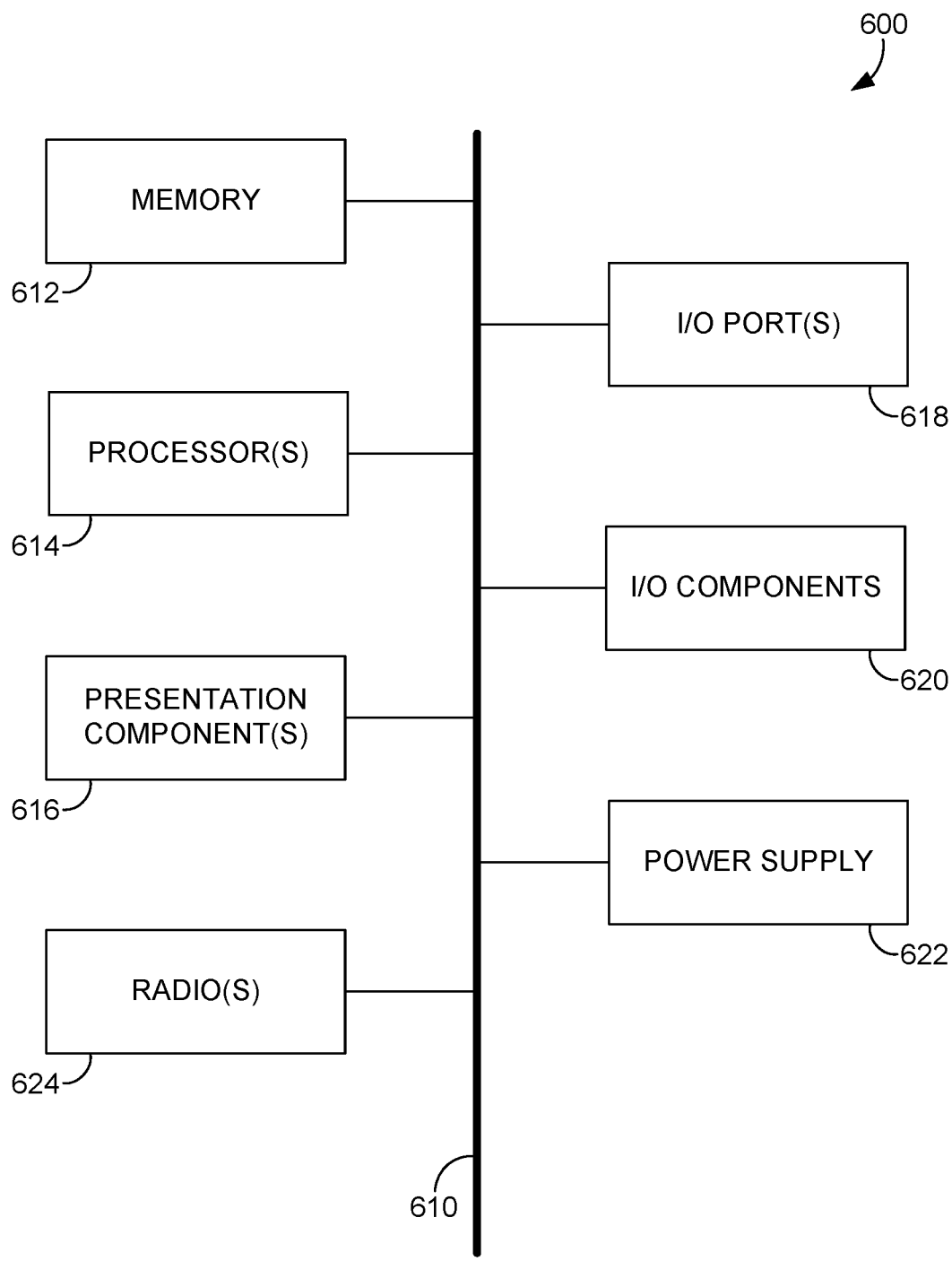
FIG. 6 depicts an exemplary computing device suitable for use in implementations of aspects of the present disclosure.

Referring now to FIG. 6, an exemplary computing environment suitable for use in implementations of the present disclosure, is illustrated. In particular, the computer environment is shown and designated generally as a computing device 600. The computing device 600 is but one example of a suitable computing environment and is not intended to suggest any limitation as to the scope of use or functionality described in the present disclosure. Neither should the computing device 600 be interpreted as having any dependency or requirement relating to any one or combination of components illustrated in FIG. 6.

The implementations of the present disclosure may be described in the general context of a computer code or machine-useable instructions, including computer-executable instructions, such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, and the like. Implementations of the present disclosure may also be practiced in distributed computing environments where tasks are performed by remote-processing devices that are linked through a communications network.

With continued reference to FIG. 6, the computing device 600 includes a bus 610 that directly or indirectly couples the following devices: a memory 612, one or more processor(s) 614, one or more presentation component(s) 616, input/output (I/O) port(s) 618, I/O components 620, a power supply 622, and radio(s) 624. The bus 610 may include one or more busses (such as an address bus, a data bus, or a combination thereof). Although the devices in FIG. 6 are shown with lines for the sake of clarity, in reality, delineating various components is not so clear and, metaphorically, the lines would more accurately be grey and fuzzy. For example, one may consider a presentation component, such as a display device, to be one of the I/O components 620. Also, processors, such as the one or more processor(s) 614, may have the memory 612. The present disclosure herein recognizes that such is the nature of the art and reiterates that FIG. 6 is merely illustrative of an exemplary computing environment that may be used in connection with one or more implementations of the present disclosure. Distinction is not made between such categories as "a workstation," "a server," "a laptop," "a handheld device," etc., as all are contemplated within the scope of FIG. 6 and are referred to as "a computer" or "a computing device."

The computing device 600 typically includes a variety of computer-readable media. The computer-readable media may be any available media that may be accessed by the computing device 600 and includes both volatile and non-volatile media, removable and non-removable media. By way of a non-limiting example, the computer-readable media may include computer storage media and communication media. The computer storage media includes both volatile and nonvolatile, removable, and non-removable media implemented in any method or technology for storage of information, such as computer-readable instructions, data structures, program modules, or other data.

The memory 612 includes computer-storage media in the form of volatile and/or nonvolatile memory. The memory 612 may be removable, non-removable, or a combination thereof. In some examples, the memory 612 includes a solid-state memory, hard drives, optical disc drives, etc. The computing device 600 includes the one or more processors 614 that read data from various entities, such as the bus 610, the memory 612, or the I/O components 620. The one or more presentation component(s) 616 presents data indications to a person or other device. In an example, the one or more presentation component(s) 616 include a display device, a speaker, a printing component, a vibrating component, etc. The I/O port(s) 618 allow the computing device 600 to be logically coupled to other devices, including the I/O components 620, some of which may be built in the computing device 600. The I/O components 620 include a microphone, a joystick, a game pad, a satellite dish, a scanner, a printer, a wireless device, etc.

The radio(s) 624 of the computing device 600 represents a radio that facilitates communication with a wireless telecommunications network. In an example, wireless telecommunications technologies include, but are not limited to, code-division multiple access (CDMA), general packet radio service (GPRS), time-division multiple access (TDMA), global system for mobile communication (GSM), and the like. The radio(s) 624 may additionally or alternatively facilitate other types of wireless communications including wireless fidelity (Wi-Fi), worldwide interoperability for microwave access (WiMAX), long-term evolution (LTE), or other voice over internet protocol (VOIP) communications. As may be appreciated, in various embodiments, the radio(s) 624 may be configured to support multiple technologies and/or multiple radios may be utilized to support multiple technologies. The wireless telecommunications network may include an array of devices, which are not shown so as to not obscure more relevant aspects of the present disclosure. Components, such as the base transceiver station 112, a communications tower, or access points (as well as other components), may provide wireless connectivity in some embodiments.

Many different arrangements of the various components depicted, as well as components not shown, are possible without departing from the scope of the claims below. Embodiments of the present disclosure have been described with an intent to be illustrative rather than be restrictive. Alternative embodiments will become apparent to readers of the present disclosure. Alternative means of implementing the aforementioned aspects may be completed without departing from the scope of the claims below. Certain features and sub-combinations of aspects of the present disclosure are of utility and may be employed without reference to other features and sub-combinations and are contemplated within the scope of the claims.

What is claimed is:

1. One or more non-transitory computer-readable media having computer-executable instructions embodied thereon that, when executed, perform a method for activating an internet of things (IoT) device, the method comprising:
causing a user device to establish a wireless communication between the user device and the IoT device, wherein the IoT device is operating in an activation mode;
subsequent to the wireless communication being established, receiving a request from the IoT device to activate the IoT device; and
based on the received request from the IoT device, launching a user device service provider application, wherein the user device service provider application:
establishes a connection with a user account associated with the user device;
retrieves IoT device information from the IoT device;
using the IoT device information and the user account, activates the IoT device on the user account;
causing the user account to communicate with a third party account associated with the IoT device;
following the activation of the IoT device on the user account, causing the service provider application to automatically activate the IoT device with the third party account associated with the IoT device allowing the third party account to monitor the IoT device; and
communicates IoT activation information with the IoT device based on the activation of the IoT device.

2. The one or more non-transitory computer-readable media of claim 1, wherein the wireless communication is established following a tap by the user device on the IoT device to establish a near field communication.

3. The one or more non-transitory computer-readable media of claim 1, wherein the wireless communication is established following a use of a scanned code associated with the IoT device.

4. The one or more non-transitory computer-readable media of claim 1, wherein an identity of a user is authorized prior to activating the IoT device.

5. The one or more non-transitory computer-readable media of claim 4, wherein an authorization is done by facial recognition.

6. The one or more non-transitory computer-readable media of claim 4, wherein an authorization is done by a stored password.

7. The one or more non-transitory computer-readable media of claim 4, wherein an authorization is automatically done using stored information within the IoT device.

8. The one or more non-transitory computer-readable media of claim 1, wherein the activation mode is automatically initiated by factory settings installed in the IoT device.

9. The one or more non-transitory computer-readable media of claim 1, wherein the IoT device information comprises an IoT device identification.

10. A method for activating an internet of things (IoT) device, the method comprising:
receiving an indication from a user device regarding establishment of a wireless communication between the user device and the IoT device, wherein the IoT device is operating in an activation mode;
subsequent to the wireless communication being established, receiving a request from the IoT device to activate the IoT device;
based on the received request from the IoT device, launching a service provider application on the user device, wherein the service provider application on the user device:
establishes a connection with a user account associated with the user device;
retrieves IoT device information from the IoT device;
using the IoT device information and the user account, activates the IoT device on the user account;
causing the user account to communicate with a third party account associated with the IoT device;
following the activation of the IoT device on the user account, causes the service provider application to automatically activate the IoT device with the third party account associated with the IoT device allowing the third party account to monitor the IoT device; and
communicates IoT activation information with the IoT device based on the activation of the IoT device.

11. The method of claim 10, wherein the wireless communication is established following a tap by the user device on the IoT device to establish a near field communication.

12. The method of claim 10, wherein the wireless communication is established following a use of a scanned code associated with the IoT device.

13. The method of claim 10, wherein an identity of a user is authorized prior to activating the IoT device.

14. The method of claim 13, wherein an authorization is done using device recognition.

15. The method of claim 10, wherein the activation mode is automatically initiated by factory settings installed in the IoT device.

16. The method of claim 10, wherein the IoT device information comprises an IoT device identification.

17. A system for activating an internet of things (IoT) device, the system comprising a processor configured to:
receive an indication from a user device regarding establishment of a wireless communication between the user device and the IoT device, wherein the IoT device is operating in an activation mode;
subsequent to the wireless communication being established, receive a request from the IoT device to activate the IoT device;
based on the received request from the IoT device, launch a service provider application on the user device, wherein the service provider application on the user;
establishes a connection with a user account associated with the user device;
retrieves IoT device information from the IoT device;
using the IoT device information and the user account, activates the IoT device on the user account;
causing the user account to communicate with a third party account associated with the IoT device;
following the activation of the IoT device on the user account, causing the service provider application to automatically activate the IoT device with the third party account associated with the IoT device allowing the third party account to monitor the IoT device; and
communicates IoT activation information with the IoT device based on the activation of the IoT device.

18. The system of claim 17, wherein the activation of the IoT device on the user account comprises adding a billing charge to the user account.

19. The system of claim 18, wherein the billing charge is a one-time charge.

20. The system of claim 17, wherein IoT device information is an eSIM date associated with the IoT device.

* * * * *